(12) United States Patent
Zhang et al.

(10) Patent No.: US 11,731,837 B2
(45) Date of Patent: Aug. 22, 2023

(54) MATERIAL CONVEYING DEVICE

(71) Applicant: Shandong Lingxiyuan Sci-tech Development Corporation, Jinan (CN)

(72) Inventors: Xiaofeng Zhang, Jinan (CN); Lanying Ma, Jinan (CN); Peng Qi, Jinan (CN); Xiaoqi Zhang, Jinan (CN)

(73) Assignee: SHANDONG LINGXIYUAN SCI-TECH DEVELOPMENT CORPORATION, Jinan (CN)

( * ) Notice: Subject to any disclaimer, the term of this patent is extended or adjusted under 35 U.S.C. 154(b) by 0 days.

(21) Appl. No.: 17/269,861

(22) PCT Filed: Sep. 30, 2020

(86) PCT No.: PCT/CN2020/119211
§ 371 (c)(1),
(2) Date: Feb. 19, 2021

(87) PCT Pub. No.: WO2021/243912
PCT Pub. Date: Dec. 9, 2021

(65) Prior Publication Data
US 2023/0080452 A1   Mar. 16, 2023

(30) Foreign Application Priority Data

Jun. 4, 2020   (CN) .......................... 202010500732.2

(51) Int. Cl.
*B65G 23/02*   (2006.01)
*B65G 19/08*   (2006.01)
(Continued)

(52) U.S. Cl.
CPC ............. *B65G 23/02* (2013.01); *B65G 19/08* (2013.01); *B65G 19/22* (2013.01); *B65G 21/2054* (2013.01)

(58) Field of Classification Search
CPC ........ B65G 19/04; B65G 19/06; B65G 19/08; B65G 19/10; B65G 19/12; B65G 19/22; B65G 19/225; B65G 21/2054
(Continued)

(56) References Cited

U.S. PATENT DOCUMENTS 2,080,828 A     5/1937   Mastin
4,043,446 A  *  8/1977   Tarrant .................. B65G 19/10
                                               198/728
(Continued)

FOREIGN PATENT DOCUMENTS

CN         1931685 A    3/2007
CN       101638173 A    2/2010
(Continued)

OTHER PUBLICATIONS

European Search Report for European Application No. 20845140; Application Filing Date Sep. 30, 2020; dated Jan. 19, 2022 (7 pages).
(Continued)

*Primary Examiner* — Mark A Deuble
(74) *Attorney, Agent, or Firm* — Cantor Colburn LLP

(57) ABSTRACT

The present invention provides a material conveying device including a material conveying groove, having a traveling track; a material bearing and conveying assembly, including: an annular chain; traveling units arranged on the chain at intervals, drivable by the chain to move on the traveling track along a material conveying direction, and provided with a bottom surface close to the material conveying groove, a top surface opposite the bottom surface and side surfaces extending between the top and bottom surfaces; a belt-shaped elastic material bearing portion, connected to the top surfaces and/or the side surfaces of the two adjacent traveling units; and a driving device to drive the chain to (Continued)

circularly rotate relative to the material conveying groove along the material conveying direction. The working state of material conveying equipment can be improved, and the stability and economic index of the equipment can be enhanced.

10 Claims, 4 Drawing Sheets

(51) Int. Cl.
  *B65G 19/22* (2006.01)
  *B65G 21/20* (2006.01)

(58) Field of Classification Search
  USPC .......... 198/735.1, 735.4, 719, 725, 727–734
  See application file for complete search history.

(56) References Cited

U.S. PATENT DOCUMENTS

| | | | | |
|---|---|---|---|---|
| 4,241,823 A | * | 12/1980 | Clewett | B65G 19/28 198/735.5 |
| 4,573,565 A | * | 3/1986 | Braun | B65G 19/22 198/734 |
| 5,495,934 A | * | 3/1996 | Tekathen | B65G 19/22 198/734 |
| 5,758,760 A | | 6/1998 | Vergeer et al. | |
| 7,159,707 B2 | * | 1/2007 | Malitzki | B65G 19/24 198/733 |
| 2011/0168528 A1 | * | 7/2011 | Perry | B65G 19/24 198/735.1 |
| 2013/0207443 A1 | * | 8/2013 | Tout | E21C 41/18 198/728 |

FOREIGN PATENT DOCUMENTS

| | | |
|---|---|---|
| CN | 101638173 B | 5/2011 |
| CN | 103261734 A | 8/2013 |
| CN | 204896543 U | 12/2015 |
| CN | 207791861 U | 8/2018 |
| CN | 208394167 U | 1/2019 |
| CN | 111056228 A | 4/2020 |
| DE | 3241129 A | 2/1984 |
| RU | 184611 U | 10/2018 |

OTHER PUBLICATIONS

Chinese Notice of Allowance Application No. 202010022714.8; dated Jun. 23, 2020; pp. 3.
Chinese Office Action Application No. 202010500732.2: dated Oct. 19, 2021; pp. 7.
Chinese Office Action Application No. Appln.: 202010500732.2; dated Feb. 23, 2021; pp. 7.
"A New Era in Polyurethane Elastomers" Version 6; Era Polymers Pty. Ltd.; Archive.org <URL: "https://web.archive.org/veb/20191020194053/https://www.erapol.com/au/wp-content/uploads/files/downloads/brochures/Elastomer_Brochure.pdf"> (Oct. 20, 2019).
Search Report Issued in Russian Application No. 2021122008/11; Application Filing Date Sep. 30, 2020; dated Mar. 5, 2022 (8 pages).

* cited by examiner

MATERIAL CONVEYING DEVICE

This application is a National Phase of PCT Application No PCT/CN2020/119211 filed Sep. 30, 2020 which claims priority to Chinese Application No. 202010500732.2 filed on Jun. 4, 2020, entitled "MATERIAL CONVEYING DEVICE", which is incorporated herein by reference in its entirety.

TECHNICAL FIELD

The present invention belongs to the field of manufacturing of mechanical equipment, particularly relates to conveying equipment, and in particular, to a material conveying device.

BACKGROUND

At present, the scraper conveyor applied to various industrial production is main transportation equipment for continuously transporting particle materials. Especially in the mining field, for example, in coal mining, the scraper conveyor can cooperate with mining equipment well to serve as a movable supporting rail of the mining equipment, and can be driven by a hydraulic bracket for position adjustment and propulsion. In particular, when the scraper conveyor is applied to the current coal mining operation, the scraper conveyor not only serves as a coal and material conveying carrier, but also is a running track of a coal mining machine; therefore, the scraper conveyor has become the indispensable main equipment in the modern coal mining technology. The scraper conveyor can maintain continuous operation, and production can be conducted normally. Otherwise, the whole coal mining face will be in a shutdown state, so that the whole production is interrupted.

The size, transportation volume and reliability of the conveyed materials are the basic characteristics of the scraper conveyor within the life period. In the complete set of scraper conveyor, the scraper is one of the key components that affect the efficiency and reliability of the scraper conveyor. The innovative and improved design of the scraper is an important part of the design of the scraper conveyor.

The main structure and components of the scraper conveyor are basically the same. The scraper conveyor mainly consists of four parts: a head part, a middle groove, a tail part and a scraper chain component. The working principle is as follows: an open groove ledge arranged on the middle groove is used as a receiving mechanism of materials such as coal and the like, and the scraper is fixed on the chain (forming a scraper chain assembly) to serve as a conveying component. When a driving device of the head part starts, a chain wheel arranged on a driving shaft and a driven shaft rotate along with the driving device, so that the scraper chain is driven to circulate and move along the groove ledge, thus achieving the aim of conveying the materials from the middle groove to the head part for unloading. The scraper chain bypasses the chain wheel chain for infinite closed cyclic operation.

In the process of making the invention, the inventor found that the failure of the scraper conveyor at present is mainly because:

the poor working condition: the scraper conveyor mainly works under the mine. Firstly, the coal gangue often slides between the groove ledge and the scraper, and the scraper and the chain is serious rubbed, resulting in the increased wear of the scraper conveyor; secondly, coal and air in the coal mining face contain corrosive substances such as sulfur, phosphorus and the like, which will also lead to the increased corrosion of the scraper conveyor.

Based on this, the failure forms of the scraper conveyor are mainly due to wear and fatigue failure. Under the certain working conditions, the maximum stress in some areas of the scraper exceeds the allowable stress of the scraper material, leading to strength failure.

At present, most of the scraper conveyors for coal mine are forged and pressed products of alloy steel materials and have a large weight and high friction resistance; and the scraper and the groove ledge bottom plate are under dynamic load static pressure friction wear, especially the extrusion wear of the scraper and the groove ledge seriously affects the service life of the scraper conveyor. Furthermore, the no-load of the scraper conveyor is too large due to the weight of the scraper made of alloy materials, and about 35% or above of driving output power is used to do work to drive the scraper to move. In order to meet the demand for transportation capacity, only the output power of the driving device can be increased. In this way, on one hand, energy consumption and the transportation cost of the equipment will be increased; on the other hand, to improve the output power, it is necessary to increase the volume and weight of the driving device and increase the manufacturing cost of the equipment; meanwhile, the overweight driving device will increase the whole weight of the scraper conveyor and the working pressure of the hydraulic bracket; furthermore, due to too large volume of the driving device, higher requirement on the operating space of the work place is put forwards, so that the flexibility of the scraper conveyor is reduced and the work limitation is increased.

In addition, the scraper is made of alloy steel, and after the materials such as coal mined by the coal mining equipment collide with the scraper in the discharging process, it is possible that larger blocky coal will be crushed, which will affect the quality of the coal products, thus reducing the economic index of mining from another aspect.

In summary, the above defects of the existing scraper structure will limit the service life and properties of the whole scraper conveyor, and improving the structure of the existing scraper conveyor has become an urgent problem that needs to be solved by those skilled in the art.

The above technical problems are discovered by the inventor in the process of realizing the invention, which are the inventor's technical knowledge, but do not necessarily constitute the prior art.

SUMMARY

The present invention aims to provide a material conveying device so as to solve the technical problems or defects mentioned in at least one background technology, for example, the produced coal is damaged since the falling coal blocks collide with the scraper or the wear-resistant layer device of the conveying groove and the coal quality is reduced; the scraper has an unideal service life, short replacement cycle and high replacement frequency; and the entire scraper conveyor has low effective work applying rate and high no-load energy consumption, etc.

The technical intention of the present invention is realized by the following technical solution:

A material conveying device includes:

a material conveying groove, having a traveling track;

a material bearing and conveying assembly, including:

an annular chain;

traveling units, arranged on the chain at intervals, wherein the traveling units are able to be driven by the chain to move on the traveling track along a material conveying direction, and each traveling unit is provided with a bottom surface close to the material conveying groove, a top surface opposite to the bottom surface and a side surface extending between the top surface and the bottom surface;

a belt-shaped elastic material bearing portion, connected to the top surfaces and/or the side surfaces of the two adjacent traveling units; and a driving device, being able to drive the chain to rotate circularly relative to the material conveying groove along the material conveying direction.

In the working process of the traditional material conveying equipment such as the scraper conveyor, coal blocks mined by coal mining equipment directly fall between the traveling units, such as the scrapers, dragged by the chain of the scraper conveyor, and then are pushed by the scrapers for transportation. The elastic material bearing portion is arranged between the adjacent scrapers and the coal blocks will fall onto the elastic material bearing portion after falling, which changes the conveying mode of the coal from being pushed by the scraper to being born by the scraper for conveying. Most of the coal blocks maintain relatively static with the scraper in the conveying process and hardly roll. The friction force mode of the scraper is changed. When overall pushing the coal blocks, the scraper chain in the traditional scraper conveyor is subjected to a resistance in a direction opposite to a running direction and is also subjected to a friction force caused by the own weight applied to the material conveying groove. The scraper chain system bears the coal blocks in such a way that the scraper is only subjected to the friction force, which makes it possible to reduce the friction force by improving a friction interface, thereby reducing the load of the whole scraper conveyor.

In addition, the elastic material bearing portion may prevent the coal blocks from directly falling into the material conveying groove. If the coal blocks directly fall into the material conveying groove, the coal blocks are pushed between the scrapers, and especially, when the fine coal gangue in the coal enters between the scraper and the material conveying groove, the coal gangue is very hard, which will increase the friction loss of the scraper and the material conveying groove and further affect the service life of the scraper. The elastic material bearing portion bears the coal blocks, reduces the probability that the block is damaged through elastic buffering, reduces the falling of the coal gangue from large coal blocks, and directly prevent the coal gangue from directly falling into the material conveying groove to form a barrier blocking the coal gangue.

In addition, the elastic material bearing portion improves the state of the coal in the conveying process, and the coal blocks are not collided and hardly roll, so that the quality of the coal may be improved, the block rate of the coal blocks is increased and coal powder is reduced, thereby increasing the economic benefit of coal production. The reduction of the coal powder may further reduce dust pollution in the coal mining field and improve the working environment and safety.

The implementation of the above solution may be based on the technical transformation of the existing scraper conveyor, for example the traveling unit may adopt the scraper of the existing scraper conveyor, and the elastic material bearing portion is arranged between the scrapers according to equipment specifications, so that the operating environment of quick-wear parts, the scraper, the scraper chain and the groove ledge of the material conveying groove, in the existing scraper conveyor is improved, the replacement and maintenance cycles of the quick-wear parts are prolonged, and the stability of the whole equipment is improved. Another implementation manner may be applied to preparation of new equipment. The structure and style of the traditional scraper may be changed to manufacture a sliding block only for bearing the elastic material bearing portion and the coal.

That is, through the elastic material bearing portion, the properties and the stability of the material conveying equipment can be improved, the coal quality can be effectively improved and obvious economic benefits can be brought. The solution may be implemented on the basis of the transformation of the existing equipment and has very high popularization value.

In a preferred implementation manner, the elastic material bearing portion covers the tops of the traveling units.

Each traveling unit serves as a structure supporting and connecting the elastic material bearing portion, so that the elastic material bearing portion covers the top of the traveling unit and all the fallen coal blocks may fall on the top surface of the elastic material bearing portion, thereby protecting the traveling unit from being hit by the coal blocks. In this way, the traveling unit and the coal blocks may be protected at the same time. For example, if technical transformation is conducted based on the existing scraper conveyor to implement the above solution, the scraper has higher hardness and strength. After the top of the scraper collides with the coal block, the top of the scraper may be damaged and the coal block may be crushed.

In a preferred implementation manner, a width of the elastic material bearing portion extending along a direction vertical to the material conveying direction is not less than a material bearing width of the material conveying groove.

The ideal way is to make the elastic material bearing portion completely cover a material falling channel of the material conveying groove and completely prevent the coal from entering a space between the material conveying groove and the elastic material bearing portion. At the moment, a structural improvement method cooperating with the elastic material bearing portion is preferred, for example, edge blocking structures extending upwards and/or outwards are formed on two sides of the elastic material bearing portion, may exert the material blocking effect and meet the requirement of high conveying quantity.

In a preferred implementation manner, a middle part of the elastic material bearing portion is arched; and the elastic material bearing portion is arched towards a direction away from the material conveying groove when being connected to the two adjacent traveling units.

The elastic material bearing portion itself is considered to be made of an elastic material to elastically bear materials. The arched structure is further provided, so that the whole elasticity of the elastic material bearing portion may be improved. Furthermore, the arched shape such as an arched arc may offset the impact when some coal blocks fall through the arched surface.

The arched structure may be implemented in a way that the elastic material bearing portion has uniform thickness and is entirely made into the arched structure. The arched structure in such way has additional advantages, for example, when the whole machine operates, the traveling unit such as the scraper needs to pass through a chain wheel at the head and the tail of the machine, and at this time, the chain changes direction to drive the elastic material bearing portion to bend. The arched structure is beneficial to reducing the resistance of bending and direction changing. Furthermore, the elastic material bearing portion with the arched structure also can reduce the requirement on the manufacturing precision and the assembling precision. The arched structure may appropriately expand and retract to change a connection length, therefore, when the elastic material bearing portion is mounted, a little manufacturing deviation or assembling deviation may be allowed.

In addition, there may be another arching mode, for example, the elastic material bearing portion has a flat bottom structure, and the middle of the top protrudes to form an arch, thereby achieving the aims of improving the whole elastic buffering property of the elastic material bearing portion and providing a convex surface offsetting the impact.

In a preferred implementation manner, a material of the elastic material bearing portion is macromolecular polyurethane, and the property parameters meet:

hardness: SHA60-SHD80;
tensile strength: 25-80 MPa;
tear strength (right angle): 50-230 KN/m;
elongation at break: 300-800%; and
resilience: 25-70%.

Based on the above property requirement, manufacturing the corresponding elastic material bearing portion by an elastic material with corresponding properties, such as the macromolecular polyurethane, may meet the requirement of the technical solutions in various implementation manners of the present invention on the elastic material bearing portion, thereby achieving the technical effects mentioned above. The above property requirement is mainly based on the hope that the obtained elastic material bearing portion has a light weight, certain strength, certain elasticity and higher wear resistance.

In a preferred implementation manner, a thickness of the elastic material bearing portion is 10 mm to 50 mm.

To achieve a good application effect, it is an ideal choice to prepare the elastic material bearing portion with the above thickness range. The above dimensions of the elastic material bearing portion are selected to ensure that impact and load caused by the materials such as the coal blocks falling on the elastic material bearing portion may be resisted. It should be noted that a thickness of the elastic material bearing portion may be uniform or may be locally increased. For example, a closely embedded portion protruding downwards may be formed in a gap between transmission chains, and the elastic material bearing portion will be close to the transmission chains after deformation, which will provide a more favorable buffer environment and may absorb impact caused by most of materials.

In a preferred implementation manner, a plurality of adjacent elastic material bearing portions have an integrated structure.

Commonly, each elastic material bearing portion is made as a separate module, the number of the elastic material bearing portions is consistent with the number of the traveling units, and one elastic material bearing portion is arranged between two adjacent traveling units. The implementation manner is the first chosen implementation manner, by which the resistance is small when the chain changes directions at the machine head and the machine tail. Two or more than two elastic material bearing portions are connected into an integrated structure, this implementation manner is suitable for the scene where the elastic material bearing portion is made of a coiled material. Manufacturing the elastic material bearing portions includes, but is not limited to two ways, for example, the elastic material bearing portion is manufactured by mold pressing; and for another example, the elastic material bearing portion is manufactured by cutting the coiled material. In consideration of the actual requirements of industrial application, under different scales and production capacities or different production conditions of manufactures, there may be high difficulty or high cost if the elastic material bearing portion is manufactured by mold pressing; and the utilization ratio of the materials may be improved if the elastic material bearing portion is manufactured by cutting and several elastic material bearing portions are connected together by the integrated structure.

In a preferred implementation manner, an arc-shaped protrusion is formed on a surface, away from one side of the traveling track, of the elastic material bearing portion.

The arc-shaped surface of the protrusion may buffer falling materials such as coal blocks; meanwhile, the arc-shaped surface may play a role in "unloading force", just as an armor with an arc-shaped surface may enhance defensibility on linear impact. In addition, the running process of the chain is not in an absolute pull-in state, certain pulse fluctuation is allowed. When reflected on the adjacent scrapers, a distance between the scrapers will change slightly. The change of the distance between the adjacent scrapers will pull or extrude the elastic material bearing portion. This pulling or extrusion will drive the elastic material bearing portion to produce elastic deformation and accumulate elastic potential energy. The elastic potential energy acts on the outside to further enhance the ability of resisting impact of the elastic material bearing portion.

In a preferred implementation manner, a rolling structure is arranged on one side, close to the traveling track, of each traveling unit.

Since the coal falls on the elastic material bearing portion, the coal, together with the elastic material bearing portion, is born and dragged by a moving unit. At this time, the whole load is mainly the friction force between the scraper and the material. The friction force is related to the wear of the scraper and affects the driving design of the whole machine. The elastic material bearing portion isolates the coal, so that the coal does not fall between the scraper and the material conveying groove, thereby providing an ideal working environment for the setting of the rolling structure. When the condition of the contact surface remains unchanged, the rolling friction coefficient is much lower than the sliding friction coefficient.

The rolling contact mode of the traveling unit and the material conveying groove and the design of the elastic material bearing portion cooperate with each other and complement each other, so that the whole load is reduced in an ideal way, the wear of a sliding unit and the material conveying groove is reduced, and the smooth operation degree of the device is improved. When the driving condition remains unchanged, it is possible to increase the conveying capacity. Under the same conveying capacity, driving may be appropriately reduced. The reduction of driving may bring obvious advantages. For example, energy consumption can be reduced. For another example, the occupied space of the driving device can be reduced, which is very important in some working environments such as mining work.

The rolling structure has the disadvantage of low stability. The frequency of possible failures of the rolling body such as the roll ball, roll wheel and the like is higher. The main reason of the failure is that the contact surface is mixed with hard impurities, which brings unknown impact, vibration or wear. The elastic material bearing portion can isolate impurities to protect the rolling structure.

As mentioned above, although the elastic material bearing portion increases the pressure caused by the increase of the no-load weight of the running structure, sliding friction is changed into rolling friction and the friction coefficient is reduced. The whole load of the device is entirely reduced. In fact, if it is not necessary to rely on the existing scraper structure as the traveling unit for material conveying, the actual no-load weight may be further reduced, for example, a volume of a sliding block as the traveling unit is reduced, or the sliding block as the traveling unit is made of a lightweight material.

In a preferred implementation manner, the traveling units are scrapers.

As an application scene where the technical concept of the application is widely implemented at present, that is, technical transformation of the existing scraper conveyor, the scraper serves as the traveling unit for mounting the elastic material bearing portion, and the technical concept of the application may be realized and the corresponding technical effect may be achieved only by simple improvement. For the scraper conveyor in use, the transformation method is very suitable and has the advantages of short transformation period, low transformation cost and obvious transformation effect.

It should be emphasized that the above overview is only used for the purpose of illustration and is not considered as a limitation to the present invention. In addition to the exemplary aspects, embodiments and features described above, the further solutions, embodiments and features of the present invention will be easily understood with reference to the accompanying drawings and the following detailed description.

BRIEF DESCRIPTION OF THE DRAWINGS

In the drawings, unless otherwise specified, the same reference numerals throughout various drawings represent the same or similar parts or elements. These drawings are not necessarily drawn to scale. It should be understood that the drawings only describe some embodiments disclosed according to the present invention and should not be considered as a limitation to the scope of the present invention.

DETAILED DESCRIPTION OF THE EMBODIMENTS

Hereinafter, only some exemplary embodiments are briefly described. As may be recognized by those skilled in the art, the described embodiments may be modified in different ways without departing from the spirit and scope of the present invention. Therefore, the accompanying drawings and description are considered as illustrative in nature and not restrictive.

Figure 1:
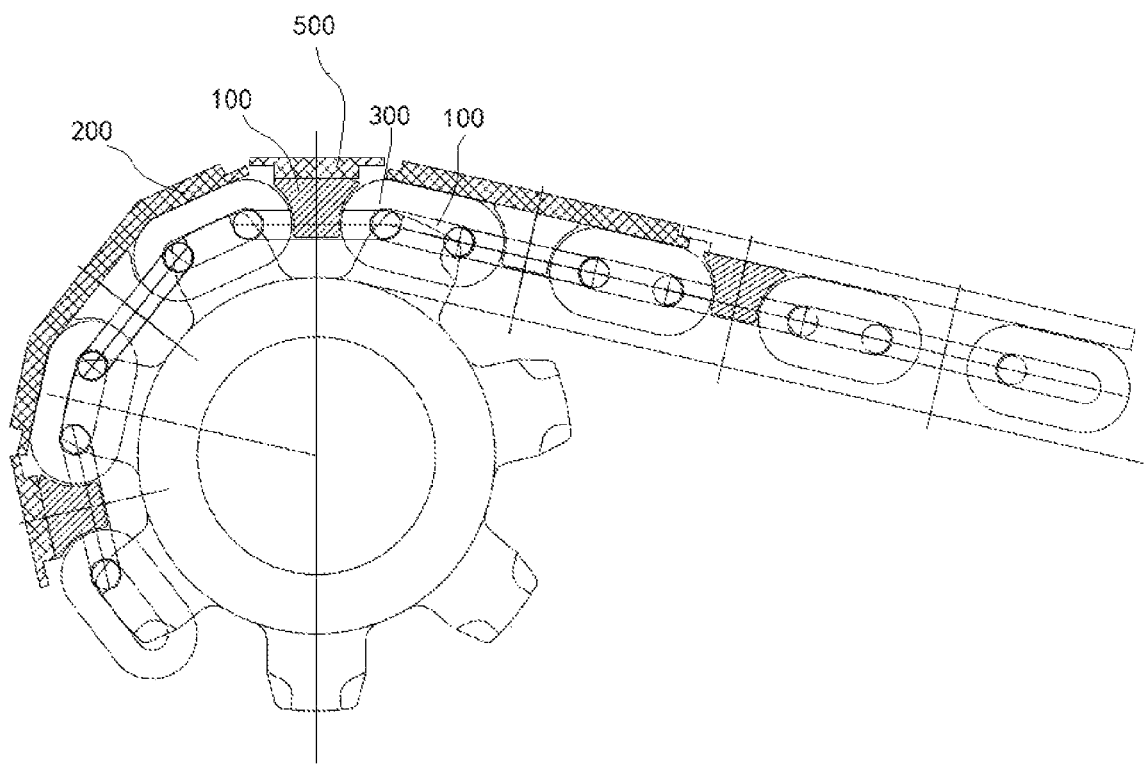
FIG. 1 is schematic diagram of a local structure of a material conveying device according to an embodiment of the present invention.
Figure 2:
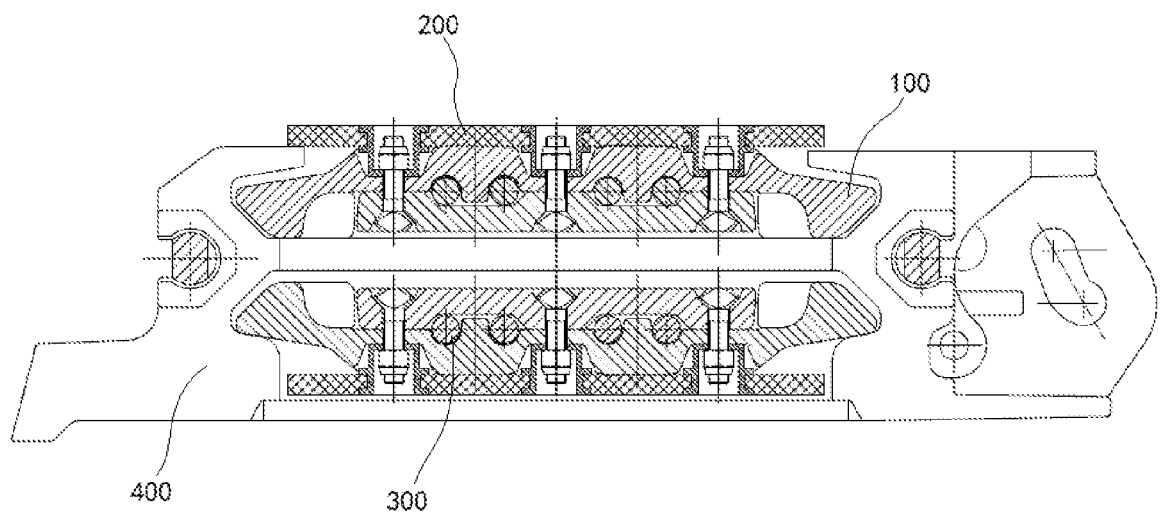
FIG. 2 is schematic diagram of a section cutting structure of a material conveying device according to an embodiment of the present invention, wherein a section cutting plane passes through a traveling unit.

As shown in FIG. 1 and FIG. 2, a material conveying device is shown and includes:

a material conveying groove 400, having a traveling track, wherein the track structure is, for example, a guide groove with roughly uniform size or a mutually embedded guide structure such as a sliding rail matched with a sliding block with a sliding groove, or such as a track matched with a traveling wheel.

A material bearing and conveying assembly includes:

an annular chain 300 (a local part of which is shown in the figure, in fact, a conveying groove is provided with a supporting structure for the annular chain to move back and forth on an upper side and a lower side of the conveying groove);

traveling units 100, arranged on the chain 300 at intervals, wherein the traveling units 100 are able to be driven by the chain 300 to move on the traveling track along a material conveying direction, and each traveling unit 100 is provided with a bottom surface close to the material conveying groove 400, a top surface opposite to the bottom surface as well as side surfaces extending between the top surface and the bottom surface; and a belt-shaped elastic material bearing portion 200, connected to the top surfaces and/or the side surfaces of the two adjacent traveling units 100, wherein as shown in the figure, the elastic material bearing portion 200 may be arranged in various flexible ways; as shown in the figure, the traveling units may be densely arranged on the chain, the elastic material bearing portion 200 is connected between the adjacent traveling units 100, some separate auxiliary material bearing portions 500 are separately arranged at the top of one traveling unit and cooperate with the elastic material bearing portions 200 adjacent to the auxiliary material bearing portions 500 through stepped surfaces, the auxiliary material bearing portions cooperate with the elastic material bearing portions to form a complete material bearing system, and a gap which may be telescopically deformed is reserved, thus making makes annular circular operation smoothly. Of course, preferably, the inventor hopes that the elastic material bearing portions are closely arranged at the tops of the traveling units, such as a gap is not reserved in the middle, and elastic deformation is supported during annular circular operation by the elasticity of the elastic material bearing portion, thus ensuring smooth operation.

A driving device (not shown in the figure) can drive the chain 300 to rotate circularly relative to the material conveying groove along the material conveying direction.

In the working process of the traditional material conveying equipment such as the scraper conveyor, coal blocks mined by coal mining equipment directly fall between the traveling units, such as the scrapers, dragged by the chain of the scraper conveyor, and then are pushed by the scrapers for transportation. The elastic material bearing portion is arranged between the adjacent scrapers and the coal blocks will fall onto the elastic material bearing portion after falling, which changes the conveying mode of the coal from being pushed by the scraper to being born by the scraper for conveying. Most of the coal blocks maintain relatively static with the scraper in the conveying process and hardly roll. The friction force mode of the scraper is changed. When overall pushing the coal blocks, the scraper chain in the traditional scraper conveyor is subjected to a resistance in a direction opposite to a running direction and is also subjected to a friction force caused by the own weight applied to the material conveying groove. The scraper chain system bears the coal blocks in such a way that the scraper is only subjected to the friction force, which makes it possible to reduce the friction force by improving a friction interface, thereby reducing the load of the whole scraper conveyor.

In addition, the elastic material bearing portion may prevent the coal blocks from directly falling into the material conveying groove. If the coal blocks directly fall into the material conveying groove, the coal blocks are pushed between the scrapers, and especially, when the fine coal gangue in the coal enters between the scraper and the material conveying groove, the coal gangue is very hard, which will increase the friction loss of the scraper and the material conveying groove and further affect the service life of the scraper. The elastic material bearing portion bears the coal blocks, reduces the probability that the block is damaged through elastic buffering, reduces the falling of the coal gangue from large coal blocks, and directly prevent the coal gangue from directly falling into the material conveying groove to form a barrier blocking the coal gangue.

In addition, the elastic material bearing portion improves the state of the coal in the conveying process, and the coal blocks are not collided and hardly roll, so that the quality of the coal may be improved, the block rate of the coal blocks is increased and coal powder is reduced, thereby increasing the economic benefit of coal production. The reduction of the coal powder may further reduce dust pollution in the coal mining field and improve the working environment and safety.

The implementation of the above solution may be based on the technical transformation of the existing scraper conveyor, for example the traveling unit may adopt the scraper of the existing scraper conveyor, and the elastic material bearing portion is arranged between the scrapers according to equipment specifications, so that the operating environment of quick-wear parts, the scraper, the scraper chain and the groove ledge of the material conveying groove, in the existing scraper conveyor is improved, the replacement and maintenance cycles of the quick-wear parts are prolonged, and the stability of the whole equipment is improved. Another implementation manner may be applied to preparation of new equipment. The structure and style of the traditional scraper may be changed to manufacture a sliding block only for bearing the elastic material bearing portion and the coal. In fact, the structure shown in FIG. 1 and FIG. 2 is an improved structure based on the existing scraper conveyor.

That is, through the elastic material bearing portion, the properties and the stability of the material conveying equipment can be improved, the coal quality can be effectively improved and obvious economic benefits can be brought. The solution may be implemented on the basis of the transformation of the existing equipment and has very high popularization value.

Figure 3:
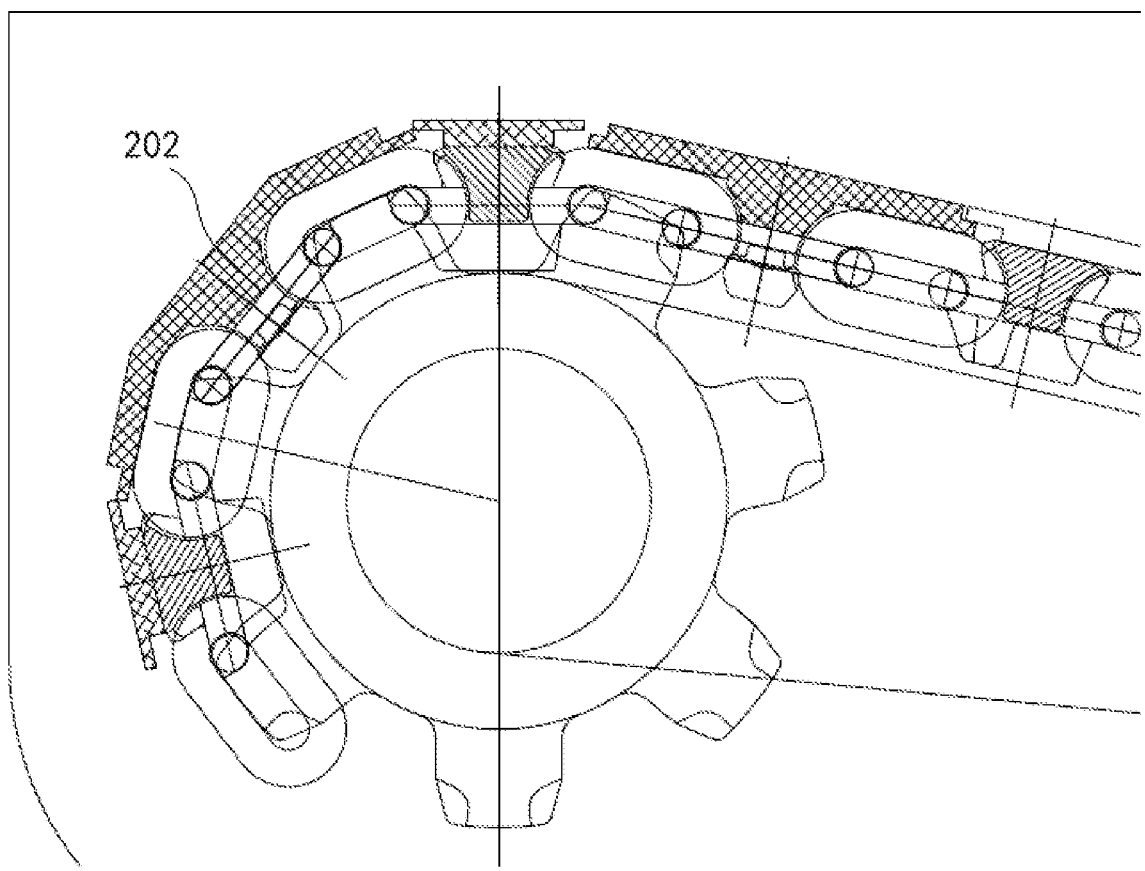
FIG. 3 is schematic diagram of a local structure of a material conveying device according to an embodiment of the present invention to show a shape and a structure of another elastic material bearing unit.

As shown in FIG. 1 or FIG. 3, the elastic material bearing portion 200 covers the tops of the traveling units 100.

Each traveling unit serves as a structure supporting and connecting the elastic material bearing portion, so that the elastic material bearing portion covers the top of the traveling unit and all the fallen coal blocks may fall on the top surface of the elastic material bearing portion, thereby protecting the traveling unit from being hit by the coal blocks. In this way, the traveling unit and the coal blocks may be protected at the same time. For example, if technical transformation is conducted based on the existing scraper conveyor to implement the above solution, the scraper has higher hardness and strength. After the top of the scraper collides with the coal, the top of the scraper may be damaged and the coal block may be crushed.

Referring to FIG. 2, a width of the elastic material bearing portion 200 extending along a direction vertical to the material conveying direction is not less than a material bearing width of material conveying groove 400.

The ideal way is to make the elastic material bearing portion completely cover a material falling channel of the material conveying groove and completely prevent the coal from entering a space between the material conveying groove and the elastic material bearing portion. At the moment, a structural improvement method cooperating with the elastic material bearing portion is preferred, for example, edge blocking structures extending upwards and/or outwards are formed on two sides of the elastic material bearing portion, may exert the material blocking effect and meet the requirement of high conveying quantity.

Figure 4:
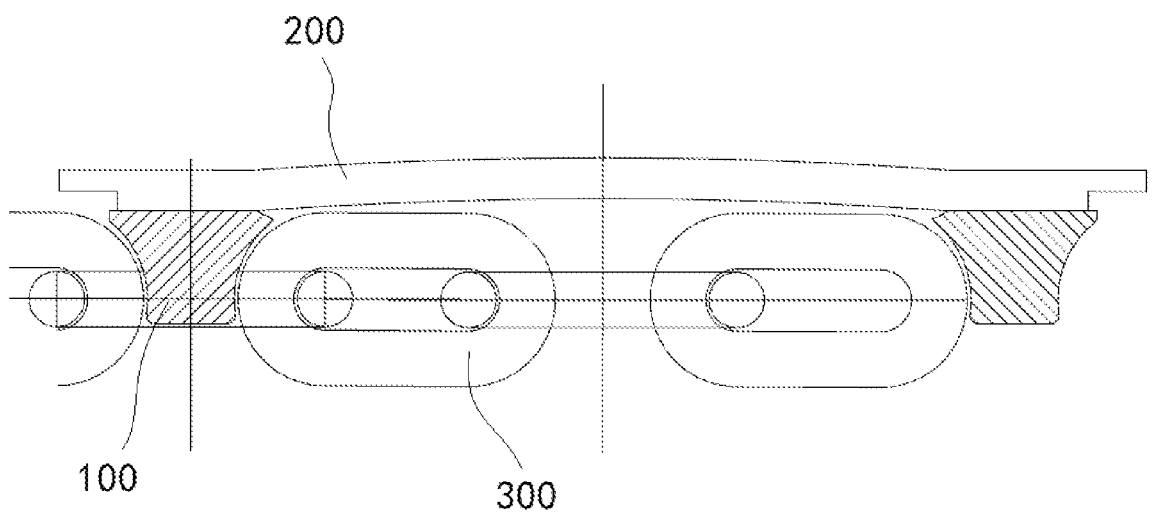
FIG. 4 is schematic diagram of a local structure of a material conveying device according to an embodiment of the present invention to show an elastic material bearing unit with an arch structure.

As shown in FIG. 4, in an ideal implementation manner, a middle part of the elastic material bearing portion 200 is arched; and the elastic material bearing portion 200 is arched towards a direction away from material conveying groove when being connected to the two adjacent traveling units.

The elastic material bearing portion itself is considered to be made of an elastic material to elastically bear materials. The arched structure is further provided, so that the whole elasticity of the elastic material bearing portion may be improved. Furthermore, the arched shape such as an arched arc may offset the impact when some coal blocks fall through the arched surface.

The arched structure may be implemented in a way that the elastic material bearing portion has uniform thickness and is entirely made into the arched structure. The arched structure in such way has additional advantages, for example, when the whole machine operates, the traveling unit such as the scraper needs to pass through a chain wheel at the head and the tail of the machine, and at this time, the chain changes direction to drive the elastic material bearing portion to bend. The arched structure is beneficial to reducing the resistance of bending and direction changing. Furthermore, the elastic material bearing portion with the arched structure also can reduce the requirement on the manufacturing precision and the assembling precision. The arched structure may appropriately expand and retract to change a connection length, therefore, when the elastic material bearing portion is mounted, a little manufacturing deviation or assembling deviation may be allowed.

In addition, there may be another arching mode not shown in the figure, for example, the elastic material bearing portion has a flat bottom structure, and the middle of the top protrudes to form an arch, thereby achieving the aims of improving the whole elastic buffering property of the elastic material bearing portion and providing a convex surface offsetting the impact.

In the research and development process, the inventor found that a material of the elastic material bearing portion is macromolecular polyurethane, and the property parameters are ensured to meet:

hardness: SHA60-SHD80;
tensile strength: 25-80 MPa;
tear strength (right angle): 50-230 KN/m;
elongation at break: 300-800%; and
resilience: 25-70%.

A good operation effect may be achieved. Based on the above property requirement, manufacturing the corresponding elastic material bearing portion by an elastic material with corresponding properties, such as the macromolecular polyurethane, may meet the requirement of the technical solutions in various implementation manners of the present invention on the elastic material bearing portion, thereby achieving the technical effects mentioned above. The above property requirement is mainly based on the hope that the obtained elastic material bearing portion has a light weight, certain strength, certain elasticity and higher wear resistance. The invention is still conducting in-depth research and believes that there may be one or more alternative materials to realize the technical concept of the present invention on the premise of specifying the property requirements. Therefore, the protection scope of the present invention includes the solution that similar materials meet the above properties through parameter adjustment.

In addition, as a key parameter, a thickness of the elastic material bearing portion is 10 mm to 50 mm.

To achieve a good application effect, it is an ideal choice to prepare the elastic material bearing portion with the above thickness range. It should be noted that a thickness of the elastic material bearing portion may be uniform or may be locally increased. Referring to FIG. 3, for example, a closely embedded portion 202 protruding downwards may be formed in a gap between transmission chains, and the elastic material bearing portion will be close to the transmission chains after deformation, which will provide a more favorable buffer environment and may absorb impact caused by most of materials.

As an implementation manner suitable for some scenes, a plurality of the adjacent elastic material bearing portions are set as an integrated structure.

Commonly, each elastic material bearing portion is made as a separate module, the number of the elastic material bearing portions is consistent with the number of the traveling units, and one elastic material bearing portion is arranged between two adjacent traveling units. The implementation manner is the first chosen implementation manner, by which the resistance is small when the chain changes directions at the machine head and the machine tail. More than two elastic material bearing portions are connected into an integrated structure, this implementation manner is suitable for the scene where the elastic material bearing portion is made of a coiled material. Manufacturing the elastic material bearing portions includes, but is not limited to two ways, for example, the elastic material bearing portion is manufactured by mold pressing; and for another example, the elastic material bearing portion is manufactured by cutting the coiled material. In consideration of the actual requirements of industrial application, under different scales and production capacities or different production conditions of manufactures, there may be high difficulty or high cost if the elastic material bearing portion is manufactured by mold pressing; and the utilization ratio of the materials may be improved if the elastic material bearing portion is manufactured by cutting and several elastic material bearing portions are connected together by the integrated structure.

Figure 5:
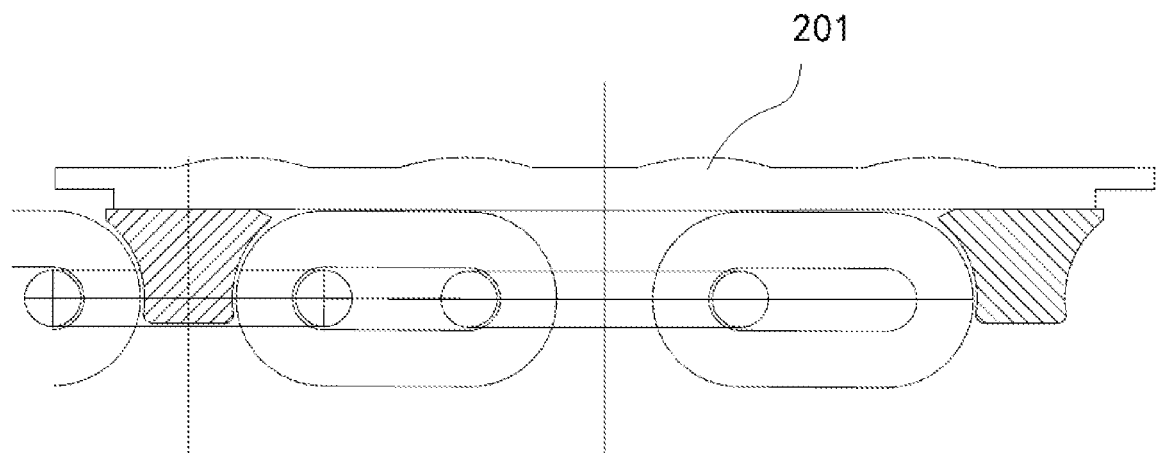
FIG. 5 is schematic diagram of a local structure of a material conveying device according to an embodiment of the present invention to show an elastic material bearing unit with a protruded top surface.

Referring to FIG. 5, in some scenes, an arc-shaped protrusion 201 is formed on a surface, away one side of the traveling track, of the elastic material bearing portion.

The arc-shaped surface of the protrusion may buffer falling materials such as coal blocks; meanwhile, the arc-shaped surface may play a role in "unloading force", just as an armor with an arc-shaped surface may enhance defensibility on linear impact. In addition, the running process of the chain is not in an absolute pull-in state, certain pulse fluctuation is allowed. When reflected on the adjacent scrapers, a distance between the scrapers will change slightly. The change of the distance between the adjacent scrapers will pull or extrude the elastic material bearing portion. This pulling or extrusion will drive the elastic material bearing portion to produce elastic deformation and accumulate elastic potential energy. The elastic potential energy acts on the outside to further enhance the ability of resisting impact of the elastic material bearing portion.

Figure 6:
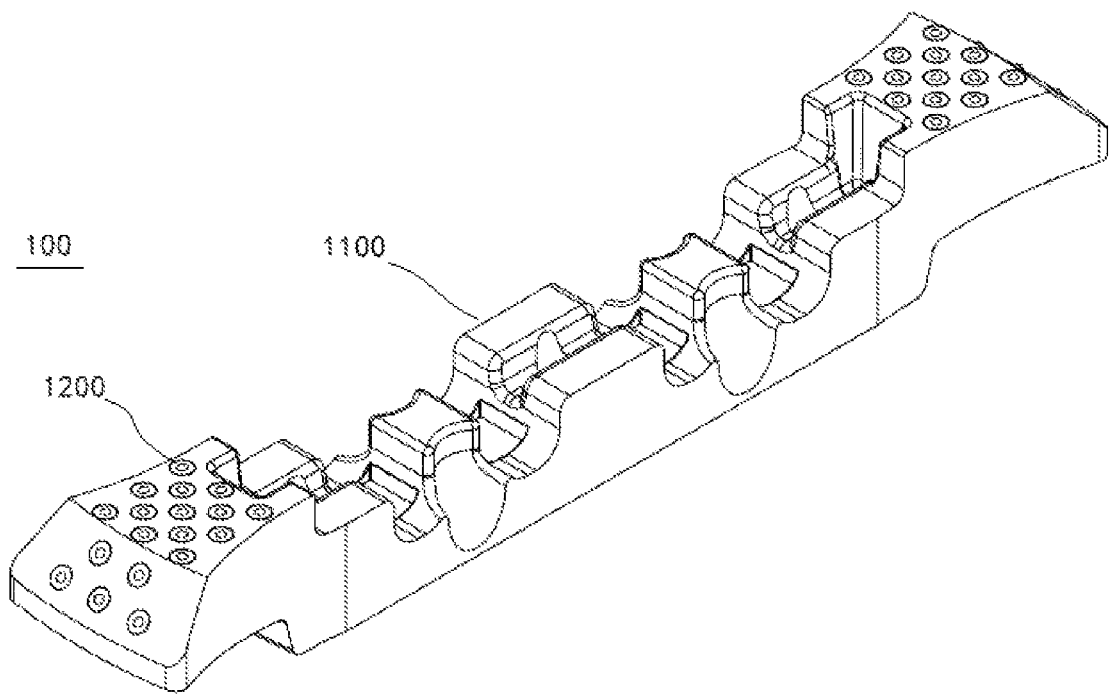
FIG. 6 is schematic diagram of a traveling unit of a material conveying device according to an embodiment of the present invention.

In addition, as a combined optimization scheme, referring to FIG. 6, the traveling unit 100 is provided with a scraper body 1100, and a rolling structure 1200 is arranged on one side, close to the traveling track, of the scraper body. The traveling unit shown in the figure is, for example, a scraper of the scraper conveyor.

Since the coal falls on the elastic material bearing portion, the coal, together with the elastic material bearing portion, is born and dragged by a moving unit. At this time, the whole load of the device is mainly the friction force between the scraper and the material. The friction force is related to the wear of the scraper and affects the driving design of the whole machine. The elastic material bearing portion isolates the coal, so that the coal does not fall between the scraper and the material conveying groove, thereby providing an ideal working environment for the setting of the rolling structure. When the condition of the contact surface remains unchanged, the rolling friction coefficient is much lower than the sliding friction coefficient.

The rolling contact mode of the traveling unit and the material conveying groove and the design of the elastic material bearing portion cooperate with each other and complement each other, so that the whole load of the device is reduced in an ideal way, the wear of a sliding unit and the material conveying groove is reduced, and the smooth operation degree of the device is improved. When the driving condition remains unchanged, it is possible to increase the conveying capacity. Under the same conveying capacity, driving may be appropriately reduced. The reduction of driving may bring obvious advantages. For example, energy consumption can be reduced. For another example, the occupied space of the driving device can be reduced, which is very important in some working environments such as mining work.

The rolling structure has the disadvantage improve the low stability. The frequency of possible failures of the rolling body such as the roll ball, roll wheel and the like is higher. The main reason of the failure is that the contact surface is mixed with hard impurities, which brings unknown impact, vibration or wear. The elastic material bearing portion can isolate impurities to protect the rolling structure.

As mentioned above, although the elastic material bearing portion increases the pressure caused by the increase of the no-load weight of the running structure, sliding friction is changed into rolling friction and the friction coefficient is reduced. The whole load of the device is entirely reduced. In fact, if it is not necessary to rely on the existing scraper structure as the traveling unit for material conveying, the actual no-load weight may be further reduced, for example, a volume of a sliding block as the traveling unit is reduced, or the sliding block as the traveling unit is made of a lightweight material.

Regarding the implementation manner of rolling friction, a particularly preferred solution is:

a supporting body is arranged on a bottom surface of the scraper body and is a non-metallic elastomer, a rolling body is arranged on a bottom surface of the supporting body, and the rolling body can support the scraper body when the scraper is located above the material conveying groove; by the rolling body, the friction mode between the scraper and the material conveying groove is changed from the original sliding friction contact into rolling friction contact, and the reduction of the friction coefficient may greatly reduce the friction resistance of the scraper and a groove body, thereby reducing the power loss of the driving device driving the scraper, finally reducing the load energy consumption of the scraper conveyor, or improving the effective work applying rate of the output power. Therefore, reduction of the rated output power of the driving device is supported to achieve the aim of reducing the specifications of the driving device and realize optimal design.

The calculation formula of the basic running resistance $W_{zh}$ of the on-load branch of the scraper conveyor is:

$$W_{zh}=(q\times\omega+q0\times\omega')L\times g\times\cos\beta\pm(q+q0)\times L\times g\times\sin\beta$$

In the formula:

$W_{zh}$—basic running resistance (N) of the on-load branch of the scraper conveyor;

L—design length (m) of the scraper conveyor;

g—gravity acceleration, $g=10$ m/s$^2$;

β—inclination angle (°) of the scraper conveyor;

q—mass (kg) of each meter of material of the scraper conveyor;

q0—mass (kg) of each meter of the scraper chain;

ω resistance coefficient of the material moving in a chute;

ω' resistance coefficient when the scraper chain moves in the on-load branch chute;

"±"—taking "+" if the scraper chain transports upwards; otherwise, taking "−".

It can be seen from the above calculation formula that when the friction contact mode is changed, the resistance coefficient ω' will obviously decrease, for example, ω' is about 0.4 according to standard design (the theoretical friction coefficient is about 0.04 and adjustment and multiplication are conducted according to the specific working condition to ensure the numerical value selected by the design to be reasonable and reliable). If the friction contact mode is changed into point-contact rolling friction mode, at least one order of magnitude can be reduced and the numerical value can be reduced to 0.004, thereby obviously reducing the operation resistance.

In addition, the rolling friction contact mode is bound to reduce the wear condition of the scraper and the groove ledge of the conveying groove, especially in cooperation with the supporting body constructed by the non-metallic elastomer, the contact of the rolling body and the conveying groove can be buffered by the elastic supporting body, thus further improving the operation stability of the scraper chain assembly in the rolling friction contact process. The most direct effect is that the wear loss of the scraper and the conveying groove is greatly reduced by the changed friction mode, and the replacement and maintenance cycles of the scraper are greatly prolonged and can be basically prolonged by at least three times or above compared with the traditional alloy steel scraper. Moreover, due to the change of the friction contact mode, the failure part of the scraper mainly occurs in the supporting body, and the scraper main body is hardly worn. When the scraper is replaced or maintained, it is only necessary to replace or maintain the supporting body, thus reducing the maintenance cost and improving the maintenance efficiency.

From another point of view, the supporting body serves as one part of the scraper, and the scraper body adopts the non-metallic elastomer instead of the common alloy steel, so that the weight of the scraper can be reduced to a certain degree, and the no-load load of the scraper conveyor can be further reduced.

The rolling body is arranged on the supporting body, the elastic function of the supporting body is to make the supporting body show a certain "expansion" trend, and the trend is released on the bottom surface of the supporting body to push the rolling body close to the conveying groove, so that the rolling body and the conveying groove can still be in effective contact. When a plurality of rolling body are provided, it may be ensured that all the rolling bodies can reliably keep contact with the conveying groove. On one hand, the load of the whole scraper is balanced, and on the other hand, the service life and the replacement cycle of the rolling bodies are uniform, so that the actual requirements of the industrial design are met.

Furthermore, when the supporting body supports the entire scraper by the rolling body, the scraper as a whole has a certain degree of buffering. When the scraper receives impact applied by the top, the elasticity of the supporting body can buffer and absorb part of impact, so that the reverse impact received by the coal falling on the scraper can be reduced to a certain degree, thus enabling the coal to fall into the conveying groove after receiving the buffer, reducing the crushing events of the coal, increasing the proportion of the blocky coal in the coal and improving the quality of the coal.

The supporting body formed by the non-metallic elastomer serves as a supporting structure for mounting the rolling body, so that the elastic rolling meeting the overall stability of the structure is improved. The elastic buffering force is provided by the characteristic of the material, which does not depend on the specific elastic structure, so that the load balance and long-time stable operation of the rolling body may be maintained and the elastomer may maintain a stable state for a long time, thereby avoiding the failure caused by damage or deformation of the structure and the failure to maintain an ideal elastic property. This will be very suitable for the working environment of the coal mining the effect of the scraper conveyor. One idea is to adopt a metal elastomer, for example a spring, etc., to provide a buffering mode by an elastic structure, which is proved to be infeasible by the inventor. Especially in the coal mining, the coal particles and coal gangue particles in the conveying groove cause unevenness between the scraper and the conveying groove, and the spring only can provide an elastic supporting force in a roughly fixed direction and obviously cannot stably support the rolling body. In addition, if the spring is used as an elastic support, the spring is liable to be damaged due to contact between the spring and the material particles. The blocky non-metallic elastomer can perfectly avoid the defect of the metal elastomer and can serve as a whole body to support the rolling body from multiple angles and directions, and there is no need to worry about the structure damage as long as the supporting body is replaced or reconstructed after a certain degree of wear. By selecting appropriate materials, the supporting body may have higher wear resistance and corrosion resistance while having elasticity.

Figure 7:
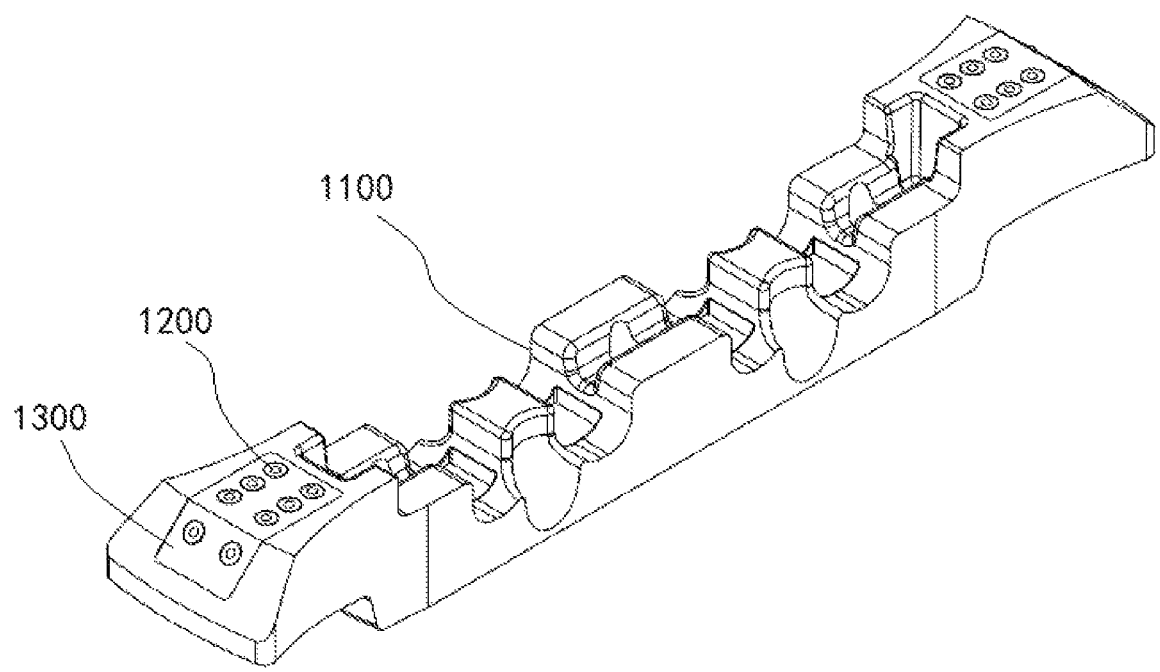
FIG. 7 is a structural schematic diagram of a traveling unit of a material conveying device according to an embodiment of the present invention.
Figure 8:
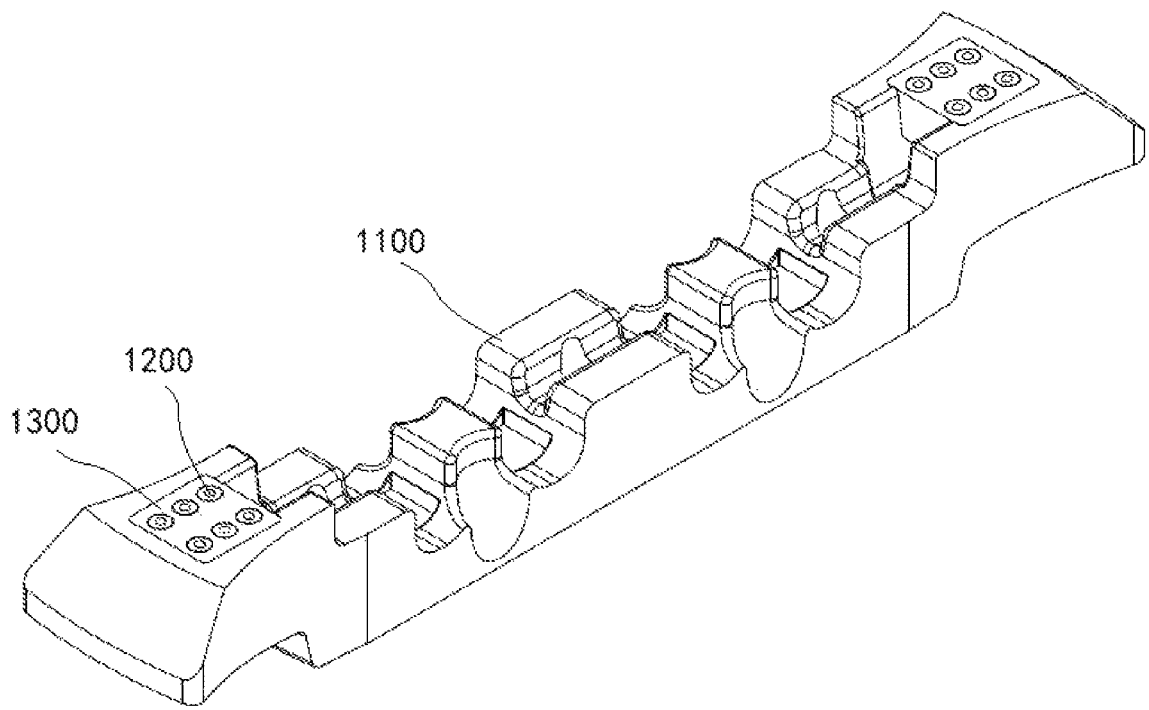
FIG. 8 is a structural schematic diagram of a traveling unit of a material conveying device according to an embodiment of the present invention.

As shown in FIG. 7 and FIG. 8, a mounting groove is formed in the bottom surface of the scraper body 1100, and the supporting body 1300 can be embedded into the mounting groove.

One of the mounting methods of the supporting body is to form the mounting groove on the scraper body and mount the processed supporting body into the mounting groove. The elastic material of the supporting body determines that assembly may be conducted in an interference fit mode, or the supporting body with a larger size directly cooperates with the mounting groove with a smaller size, and the supporting body is embedded into the mounting groove through extrusion. By the mounting method, the supporting bodies may be manufactured in batches; moreover, the rolling body may be mounted on the supporting body firstly, and then the rolling body and the supporting body are arranged on the scraper body, so that the assembling of the rolling body becomes simple and convenient. Furthermore, it is very simple and convenient to disassemble, assemble and replace the supporting body. Preferably, a texture or a step surface mutually matched with a combined surface is formed on the combined surface of the mounting groove and/or the supporting body, thereby improving the embedding tightness.

In an unshown implementation manner, the supporting body is formed on the bottom surface of the scraper body in a mold forming way.

Another forming method of the supporting body is to from the supporting body on the bottom surface of the scraper body in a secondary mold forming way similar to rubber coating, which is suitable for manufacturing appropriate scraper bodies in batches. A forming surface or a forming groove is reserved, the scraper body serves as a mold core, and the non-metallic elastic material is directly formed on the scraper body through pouring or injection and the like. By the forming method, the assembling process is simplified, and the combination tightness of the supporting body and the scraper body is improved. Of course, it also depends on the proper selection of the elastic material. An ideal combination effect may be achieved by selecting the non-metallic elastic material which is combined with the metal surface well and meets strength, corrosion resistance, weather resistance and other properties.

As mentioned above, the traveling unit may adopt the scraper of the existing scraper conveyor.

As an application scene where the technical concept of the application is widely implemented at present, that is, technical transformation of the existing scraper conveyor, the scraper serves as the traveling unit for mounting the elastic material bearing portion, and the technical concept of the application may be realized and the corresponding technical effect may be achieved only by simple improvement. For the scraper conveyor in use, the transformation method is very suitable and has the advantages of short transformation period, low transformation cost and obvious transformation effect.

Those not mentioned in the present invention may be realized by adopting or learning from existing technologies.

The above is only the specific implementation manner of the present invention, but the protection scope of the present invention is not limited to this. Various changes or substitutions that are thought of by those skilled in the technical field within the technical scope disclosed by the present invention should be covered within the protection scope of the present invention. The scope of the invention should, therefore, be determined with reference to the appended claims.

In the description of the present invention, it should be noted that, a directional or positional relationship indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like is based on that shown in the accompanying drawings, is merely intended to describe the present invention and simplify the description and does not indicate or imply that the indicated apparatus or component must have a special direction or is constructed and operated in a special direction, and thus cannot be understood as a limitation to the present invention.

Besides, the terms "first" and "second" are used only for description and shall not be interpreted as an indication or implication of relative importance or an implicit indication of the number of technical features. Thus, the feature defined by "first" and "second" can explicitly or implicitly include one or more characteristics. In the description of the present invention, "a plurality of" means two or more, unless otherwise specifically defined.

In the present invention, unless otherwise specified and defined, the terms such as "mounting", "connected", "connection", "fixed" and the like should be understood in a broad sense, for example, the "connection" may be fixed connection and may also be detachable connection or integrated connection; may be mechanical connection, may be electric connection and may also be communication, and may be direction connection, may be indirect connection through an intermediate medium and may also be internal communication of two components or interaction between two components. For those of ordinary skilled in the art, the specific meanings of the above terms in the present invention may be understood according to specific situations.

In the present invention, that a first feature is located at the "upper" or "lower" a second feature includes that the first feature is in direct contact with the second feature, or the first feature is not in direct contact with the second feature, but is in contact with the second feature by another feature between the first feature and the second feature unless otherwise specified and defined. Moreover, that the first feature is located at the "upper", "above" and "on" the second feature includes that the first feature is located right above and at the oblique top of the second feature, or only shows that the horizontal height of the first feature is greater than that of the second feature; and that the first feature is located at the "lower", "below" and "under" the second feature includes that the first feature is located under and at the oblique bottom of the second feature, or only shows that the horizontal height of the first feature is smaller than that of the second feature.

The above disclosure provides various different implementation manners or examples to implement different structures of the present invention. To simplify the disclosure of the present invention, parts and setting of the specific examples are described above. Of course, they are only examples and are not intended to limit the present invention. In addition, the present invention may repeat reference number and/or reference letters in different examples. The repetition does not indicate the relationship between various discussed implementation manners and/or setting and is for simplicity and clarity. In addition, the present invention provides various examples of specific processes and materials, but those of ordinary skill in the art may realize the application of other processes and/or use of other materials.

What is claimed is:

1. A material conveying device, characterized by comprising:
   a material conveying groove, having a traveling track;
   a material bearing and conveying assembly, comprising:
   an annular chain;
   traveling units, arranged on the chain at intervals, wherein the traveling units are able to be driven by the chain to move on the traveling track along a material conveying direction, and each traveling unit is provided with a bottom surface close to the material conveying groove, a top surface opposite to the bottom surface and side surfaces extending between the top surface and the bottom surface;
   a belt-shaped elastic material bearing portion, connected to the top surfaces and/or the side surfaces of two adjacent traveling units; and
   a driving device, being able to drive the chain to rotate circularly relative to the material conveying groove along the material conveying direction.

2. The material conveying device according to claim 1, characterized in that the
   elastic material bearing portion covers the top surfaces of each of the traveling units.

3. The material conveying device according to claim 1, characterized in that a width of the elastic material bearing portion extending along a direction vertical to the material conveying direction is not less than a material bearing width of the material conveying groove.

4. The material conveying device according to claim 1, characterized in that a middle part of the elastic material bearing portion is arched; and the elastic material bearing portion is arched towards a direction away from the material conveying groove when being connected to the two adjacent traveling units.

5. The material conveying device according to claim 1, characterized in that a material of the elastic material bearing portion is macromolecular polyurethane, and property parameters of the elastic material bearing portion meet:
   hardness: SHA60-SHD80;
   tensile strength: 25-80 MPa;
   tear strength (right angle): 50-230 KN/m;
   elongation at break: 300-800%; and
   resilience: 25-70%.

6. The material conveying device according to claim 5, characterized in that a thickness of the elastic material bearing portion is 10 mm to 50 mm.

7. The material conveying device according to claim 1, characterized in that a plurality of adjacent elastic material bearing portions have an integrated structure.

8. The material conveying device according to claim 1, characterized in that an arc-shaped protrusion is formed on a surface, away from one side of the traveling track, of the elastic material bearing portion.

9. The material conveying device according to claim 1, characterized in that a rolling structure is arranged on one side, close to the traveling track, of each traveling unit.

10. The material conveying device according to claim 1, characterized in that the traveling units are scrapers.

* * * * *